US008297503B2

(12) United States Patent
Suzuki

(10) Patent No.: US 8,297,503 B2
(45) Date of Patent: Oct. 30, 2012

(54) MERCHANDISE SALES DATA PROCESSING APPARATUS, BALANCE MANAGEMENT SYSTEM, AND DISPLAY METHOD

(75) Inventor: Yasunobu Suzuki, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 147 days.

(21) Appl. No.: 12/875,608

(22) Filed: Sep. 3, 2010

(65) Prior Publication Data

US 2011/0054671 A1 Mar. 3, 2011

(30) Foreign Application Priority Data

Sep. 3, 2009 (JP) ................................ 2009-203906

(51) Int. Cl.
*G06K 15/00* (2006.01)

(52) U.S. Cl. ...................................................... 235/383

(58) Field of Classification Search .................. 235/383
See application file for complete search history.

(56) References Cited

FOREIGN PATENT DOCUMENTS

| | | |
|---|---|---|
| JP | 04-190483 | 7/1992 |
| JP | 06-215258 | 8/1994 |
| JP | 10-320644 | 12/1998 |
| JP | 2009-009450 | 1/2009 |
| JP | 2009-205246 | 9/2009 |

OTHER PUBLICATIONS

JP 2009-009450, Kotani et al., machine translation of Japanese publication.*
JP 10-320644, Uno, machine translation of Japanese publication.*
JP 2009-205246, Kurihara, machine translation of Japanese publication.*
Japanese Office Action for Application No. 2009-203906 mailed on Jul. 26, 2011.

* cited by examiner

*Primary Examiner* — Daniel Hess
(74) *Attorney, Agent, or Firm* — Turocy & Watson, LLP

(57) ABSTRACT

A merchandise sales data processing apparatus includes a display device and a first display control unit. The first display control unit displays balance information and an input area simultaneously on the display device. The balance information is information regarding balance of each denomination in an automatic change dispenser which deposits or dispenses money. The balance information is generated by a balance information generating unit. The input area receives, through an input device, the input of change reserves information regarding change reserves that should be prepared in the automatic change dispenser.

18 Claims, 11 Drawing Sheets

MERCHANDISE SALES DATA PROCESSING APPARATUS, BALANCE MANAGEMENT SYSTEM, AND DISPLAY METHOD

CROSS-REFERENCE TO RELATED APPLICATIONS

This application is based upon and claims the benefit of priority from the prior Japanese Patent Application No. 2009-203906, Sep. 3, 2009 the entire contents of which are incorporated herein by reference.

FIELD

Embodiments relate to a merchandise sales data processing apparatus, a balance management system, and a display method.

BACKGROUND

There is a known change system which includes a POS terminal and an automatic change dispenser and in which if the change information as payment information is transmitted from the POS terminal to the automatic change dispenser, the automatic change dispenser dispenses change based on the change information (for example, refer to JP-A-6-215258).

In a store which uses this change system, a change preparation work for preparing change reserves, which is the change for the next day, in the automatic change dispenser and dispensing all or part of the today's sales amount from the automatic change dispenser as the amount of payment is performed after the store is closed or the like.

When performing the change preparation work, the clerk displays a balance display screen, on which the balance (balance of money) in the automatic change dispenser is displayed, on a display device of the POS terminal by operating the POS terminal. The clerk checks the balance in the automatic change dispenser through the displayed balance display screen. Then, the clerk displays an input screen for the change reserves on the display device of the POS terminal through a predetermined operation. The clerk inputs the information regarding the change reserves on the input screen for the change reserves. Based on this information, the POS terminal calculates the amount of payment which is a dispensed part of the today's sales amount after the change is ensured. Then, the POS terminal stores the amount of payment in a sales file.

DETAILED DESCRIPTION

Embodiments are proposed to make it easy to prepare change reserves.

Hereinafter, a merchandise sales data processing apparatus of the embodiment includes a display device and a first display control unit. The first display control unit displays balance information and an input area simultaneously on the display device. The balance information is information regarding balance of each denomination in an automatic change dispenser which deposits and dispenses money. The balance information is created by a balance information generating unit. The input area receives the input of change reserves information regarding the change reserves, which should be prepared in the automatic change dispenser, through an input device.

Hereinafter, a merchandise sales data processing apparatus, a balance management system, and a display method according to the embodiments will be described in detail with reference to the accompanying drawings.

[First Embodiment]

Figure 1:
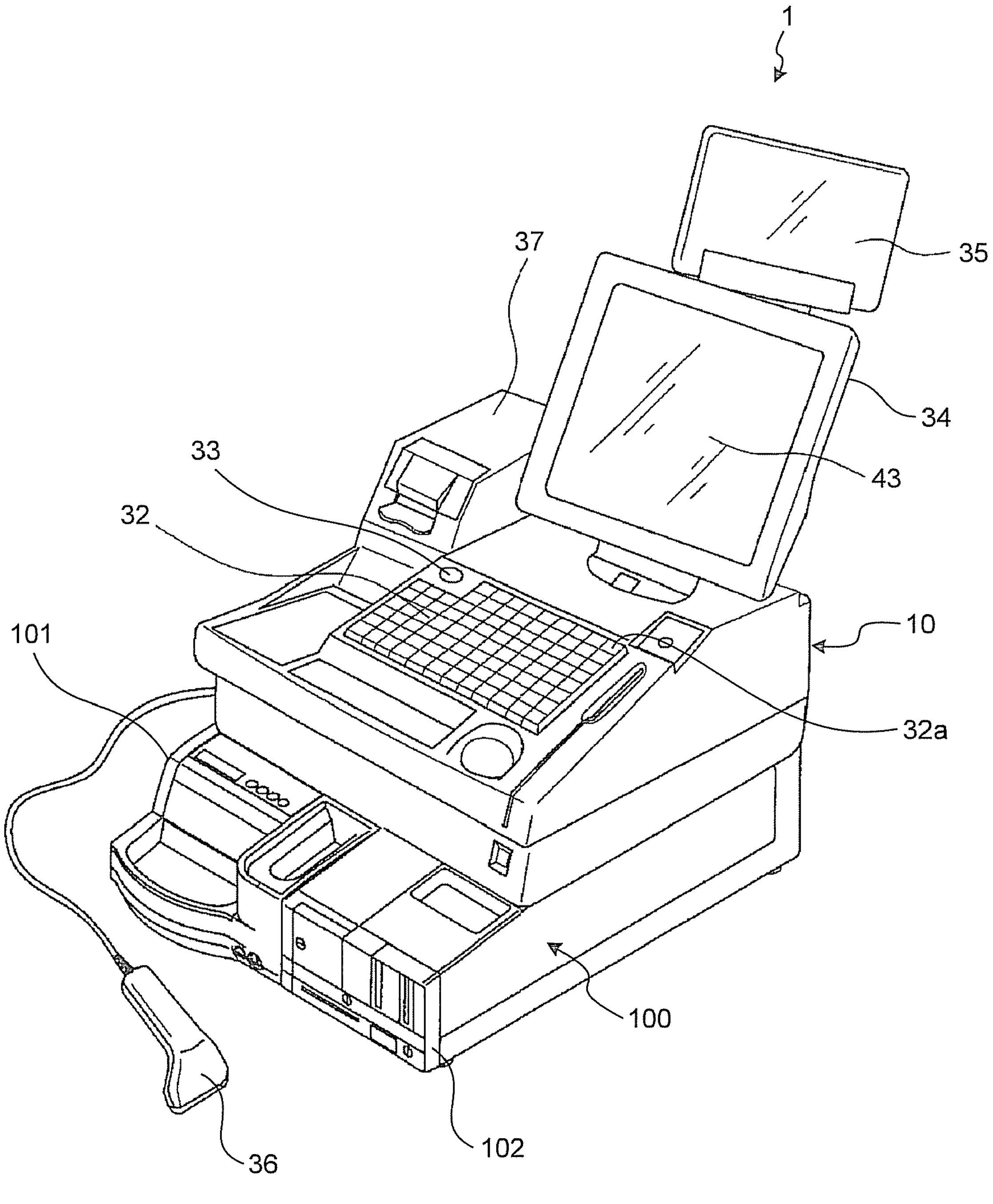
FIG. 1 is a perspective view showing the external appearance of a change system as an example of a balance management system according to a first embodiment.

FIG. 1 is a perspective view showing the external appearance of a change system 1 as an example of a balance management system according to a first embodiment. The change system 1 includes a POS terminal 10 as an example of the merchandise sales data processing apparatus, and an automatic change dispenser 100 which deposits and dispenses money. The automatic change dispenser 100 is connected to the POS terminal 10 through a communication cable (not shown).

The POS terminal 10 includes a keyboard 32, a mode key 33, a display device 34 for an operator, a display device 35 for a customer, a code scanner 36, a thermal printer 37, and the like. A touch panel 43 serving as an input device is laminated and attached to the display device 34 for an operator.

Figure 2:
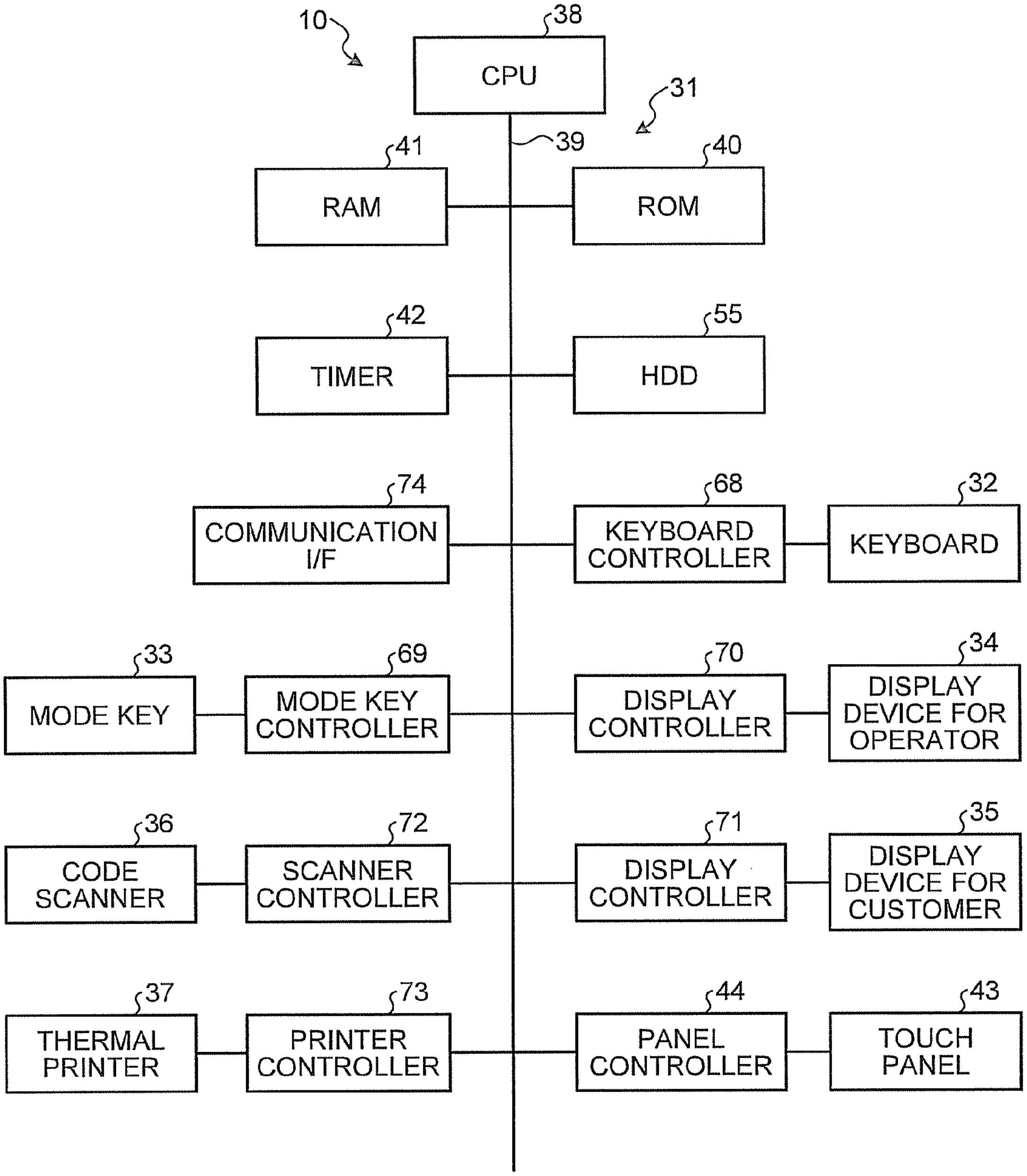
FIG. 2 is a block diagram of a POS terminal as an example of a merchandise sales data processing apparatus according to the first embodiment.

FIG. 2 is a block diagram of the POS terminal 10. A control unit 31 includes a CPU (Central Processing Unit) 38, a ROM (Read Only Memory) 40, a RAM (Random Access Memory) 41, and a timer 42. The ROM 40, the RAM 41, and the timer 42 are connected to the CPU 38 through a bus line 39, such as an address bus or a data bus. The CPU 38 centrally controls each portion. The ROM 40 stores the fixed data, such as a startup program, in advance. The RAM 41 forms various buffers, such as a sales buffer or a print buffer, and stores various kinds of data therein so as to be rewritable. The timer 42 counts the date or date and time.

A HDD (Hard Disk Drive) 55 is connected to the bus line 39 connected to the CPU 38. The HDD 55 stores a computer program for operating the control unit 31 (CPU 38), a product master file, and a sales file in which sales data and the like are stored. The product master file is a file in which a product name, a unit price, and the like are stored so as to match a product code.

The computer program stored in the HDD 55 is written into the RAM 41 together with various files, such as the product master file, at the start of the POS terminal 10. As a result, driving control of each portion using the control unit 31 becomes possible.

Next, each portion driving-controlled by the control unit 31 will be described.

The keyboard 32 has various keys, such as numeric keys, a PLU key, a category key, a subtotal key, a deposit and current sum key, a clear key, an enter key, a reset key, and a change variation and payment registration key 32*a*. The keyboard 32 is connected to the bus line 39 through a keyboard controller 68. The keyboard 32 inputs a signal corresponding to the operated key to the control unit 31 by operation of the keyboard controller 68.

The mode key 33 is connected to the bus line 39 through a mode key controller 69. The mode key 33 inputs a signal corresponding to the switching position to the control unit 31 by operation of the mode key controller 69. The control unit 31 sets the operation mode of the POS terminal 10 to each job mode, such as a registration mode, a setting mode, a checkout mode, and an inspection mode, in response to the output signal from the mode key 33.

The display device 34 for an operator and the display device 35 for a customer are connected to the bus line 39 through display controllers 70 and 71, respectively. When the display data from the control unit 31 is input to the display controllers 70 and 71, the display device 34 for an operator and the display device 35 for a customer are driven by the display controllers 70 and 71 to display predetermined items.

The touch panel 43 acquires the coordinate data by recognizing the position of X and Y coordinates on the panel touched by the operator. The touch panel 43 is connected to the bus line 39 through a panel controller 44. The touch panel 43 inputs a signal corresponding to the acquired coordinate data to the control unit 31 by operation of the panel controller 44.

The code scanner 36 optically reads a product code, such as a bar code attached to a product. The code scanner 36 is connected to the bus line 39 through a scanner controller 72. The code scanner 36 transmits the data of the read product code to the control unit 31 by operation of the scanner controller 72.

The thermal printer 37 is connected to the bus line 39 through a printer controller 73. The thermal printer 37 is driving-controlled by the control unit 31. The thermal printer 37 has a cutter (not shown). The thermal printer 37 is driving-controlled by the control unit 31 and prints necessary items as a receipt on receipt paper (not shown), which is a long sheet, and cuts it with the cutter to issue it as the receipt.

In addition, the POS terminal 10 has a communication interface 74 as a communication portion. The communication interface 74 is connected to the automatic change dispenser 100 through a communication cable. The communication interface 74 performs data communication with the automatic change dispenser 100. The communication interface 74 is connected to the bus line 39. The communication interface 74 is driving-controlled by the control unit 31.

The CPU 38 of the POS terminal 10 configured as described above performs product sales registration. In the sales registration, for example, after read input of a product code attached to a product using the code scanner 36, the CPU 38 searches a product master file on the basis of the read-input product code and reads the product information, such as a product name or a unit price corresponding to the product code. The CPU 38 performs product sales registration by storing the product code and the read product information in the RAM 41. Then, the CPU 38 calculates the sale proceeds of the transaction and stores it in the RAM 41 by pressing of the subtotal key. Then, the CPU 38 executes totaling processing when it detects that totaling was requested by operation of the deposit and current sum key. The totaling request based on the operation of the deposit and current sum key means the end of the registration of the goods that the customer purchased and the payment by the customer in cash. In the totaling processing, the CPU 38 acquires the amount of money deposited by the customer input by the numeric keys of the keyboard 32. The CPU 38 calculates the change by subtracting the sales price of the transaction, which is stored in the RAM 41, from the acquired amount of deposited money. The CPU 38 transmits the change data including the calculated change to the automatic change dispenser 100. In addition, the CPU 38 controls the thermal printer 37 to print and issue a receipt.

The automatic change dispenser 100 includes a coin deposit and dispensing portion 101 which deals with coins and a note deposit and dispensing portion 102 which deals with notes, as shown in FIG. 1. The automatic change dispenser 100 dispenses the held money on the basis of the payment information. Although denominations associated with the coin deposit and dispensing portion 101 and the note deposit and dispensing portion 102 are different, the configurations of performing processing are functionally the same. Accordingly, the coin deposit and dispensing portion 101 and the note deposit and dispensing portion 102 will be described using one drawing (FIG. 3).

Figure 3:
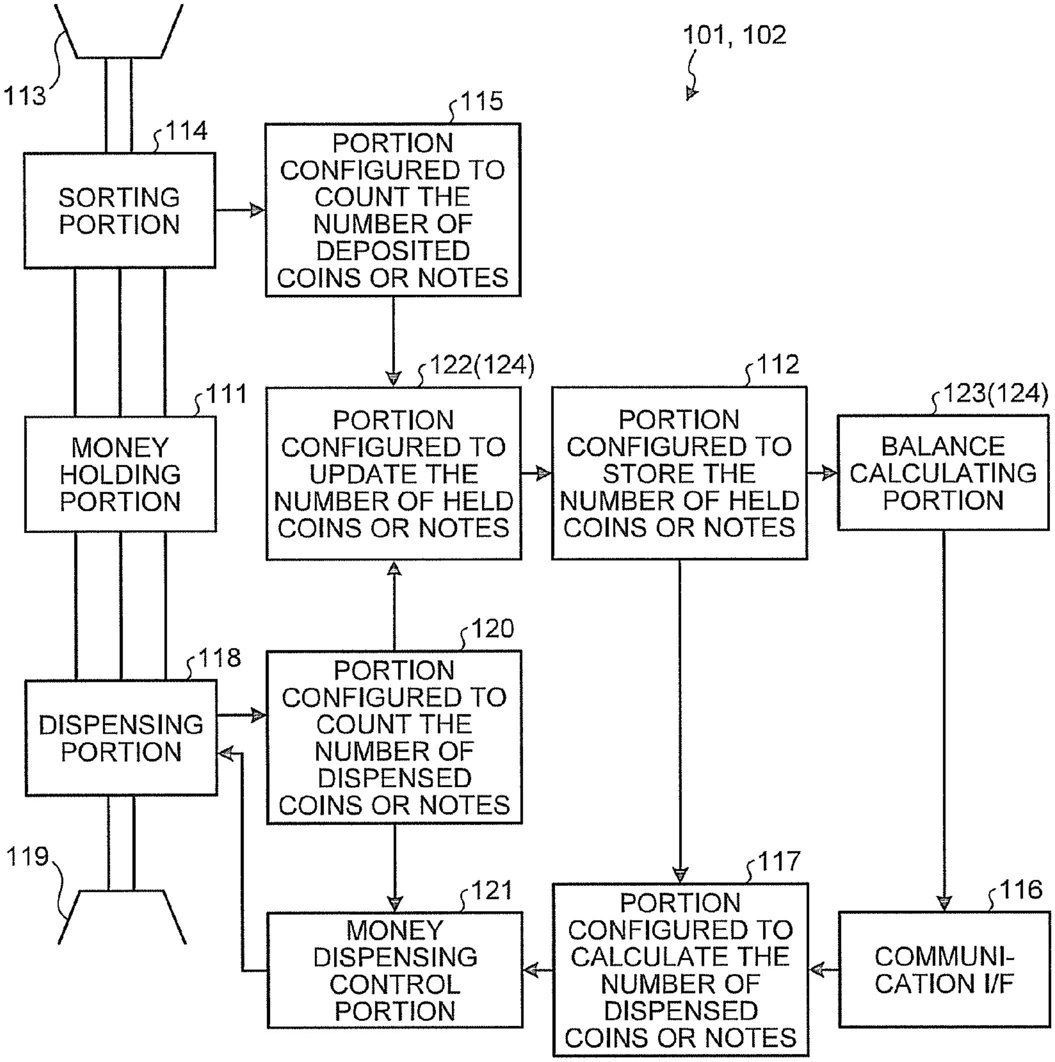
FIG. 3 is a block diagram of an automatic change dispenser according to the first embodiment.

FIG. 3 is a block diagram of the automatic change dispenser 100. Each of the coin deposit and dispensing portion 101 and the note deposit and dispensing portion 102 includes a money holding portion 111, a portion configured to store the number of held coins or notes 112, an insertion port 113, a sorting portion 114, and a portion configured to count the number of deposited coins or notes 115. The money holding portion 111 holds coins and notes according to the denomination. The portion configured to store the number of held coins or notes 112 stores the number of coins or notes of each denomination held in the money holding portion 111. Money supplemented by payment by a customer or supplemented as change reserves is inserted through the insertion port 113. The sorting portion 114 sorts out the money inserted (input) through the insertion port 113 according to the denomination and stores it in the money holding portion 111. The portion configured to count the number of deposited coins or notes 115 counts the number of coins or notes of each denomination sorted out by the sorting portion 114.

Moreover, each of the coin deposit and dispensing portion 101 and the note deposit and dispensing portion 102 includes a communication interface (in the drawing, I/F) 116, a portion configured to calculate the number of dispensed coins or notes 117, a dispensing portion 118, a dispensing port 119, a portion configured to count the number of dispensed coins or notes 120, a money dispensing control portion 121, and a portion configured to update the number of held coins or notes 122. The communication interface 116 receives the change data and the like transmitted from the POS terminal 10. The portion configured to calculate the number of dispensed coins or notes 117 calculates the number of dispensed coins or notes of each denomination on the basis of the change data received through the communication interface 116 and the data regarding the number of held coins or notes of each denomination stored in the portion configured to store the number of held coins or notes 112. The dispensing portion 118 dispenses money, which is held in the money holding portion 111, one at a time for each denomination. The dispensing port 119 receives money dispensed from the money holding portion 111 by the dispensing portion 118. The portion configured to count the number of dispensed coins or notes 120 counts the number of coins or notes of each denomination which is dispensed by the dispensing portion 118. The money dispensing control portion 121 operates the dispensing portion 118 to dispense change until the number of dispensed coins or notes of each denomination counted by the portion configured to count the number of dispensed coins or notes 120 matches the number of dispensed coins or notes calculated by the portion configured to calculate the number of dispensed coins or notes 117. The portion configured to update the number of held coins or notes 122 updates the value of the portion configured to store the number of held coins or notes 112 on the basis of the number of deposited coins or notes of each denomination counted by the portion configured to count the number of deposited coins or notes 115 and the number of dispensed coins or notes of each denomination counted by the portion configured to count the number of dispensed coins or notes 120.

In addition, each of the coin deposit and dispensing portion 101 and the note deposit and dispensing portion 102 includes a balance calculating portion 123. The balance calculating portion 123 receives a balance request command from the POS terminal 10 through the communication interface 116. In response to the balance request command received, the balance calculating portion 123 calculates the balance, which is the total amount of cash at present, by reading the data regarding the number of held coins or notes of each denomination stored in the portion configured to store the number of held coins or notes 112. The balance calculating portion 123 generates balance information including the calculated balance and transmits the balance information to the POS terminal 10 through the communication interface 116. The number of coins or notes of each denomination in the automatic change dispenser 100 and the total amount (balance) of each denomination are included in the balance information. Here, the balance calculating portion 123 forms a balance information generating portion 124, which serves as a balance information generating unit that generates the balance information indicating the balance of each denomination in the automatic change dispenser 100, together with the portion configured to update the number of held coins or notes 122. In addition, each mechanism of the respective portions of the coin deposit and dispensing portion 101 and the note deposit and dispensing portion 102 is a mechanism corresponding to the type of money to be dealt with.

Each of the coin deposit and dispensing portion 101 and the note deposit and dispensing portion 102 has a controller including a CPU, a ROM, and a RAM. This controller realizes the portion configured to calculate the number of dispensed coins or notes 117, the money dispensing control portion 121, the portion configured to update the number of held coins or notes 122, the balance calculating portion 123, and the balance information generating portion 124 as functional portions according to a program stored in the ROM.

Next, the change management processing that the CPU 38 of the POS terminal 10 executes, among various kinds of processing that the change system 1 executes, will be described. The CPU 38 executes the change management processing in a checkout mode.

Figure 4:
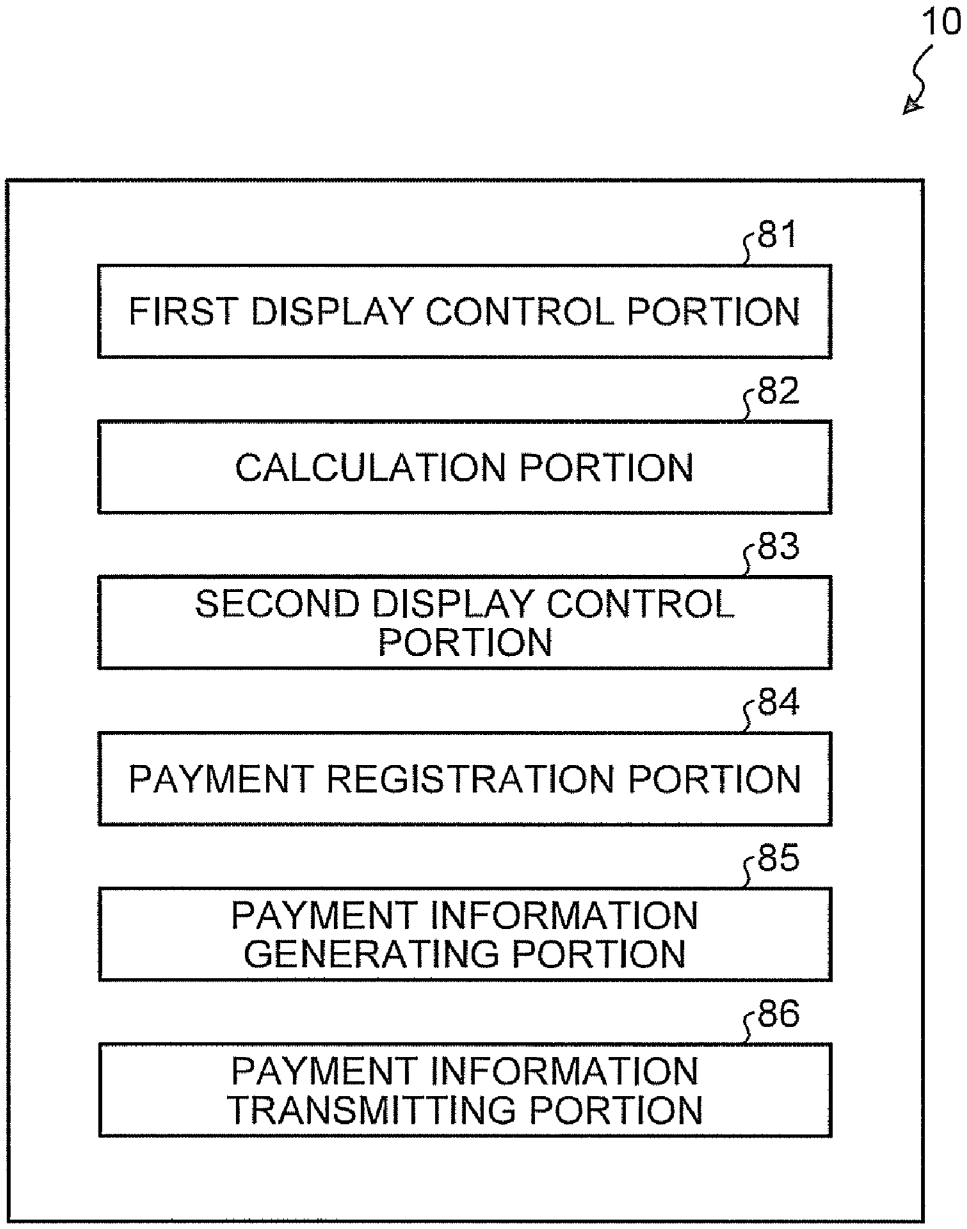
FIG. 4 is a block diagram showing the functional configuration of the POS terminal in change management processing in the first embodiment.

In the change management processing, the CPU 38 of the POS terminal 10 realizes a first display control portion 81, a calculation portion 82, a second display control portion 83, a payment registration portion 84, a payment information generating portion 85, and a payment information transmitting portion 86 as functional portions according to the program, as shown in FIG. 4.

The first display control portion 81 functions as a first display control unit. The first display control portion 81 displays balance information 201 and an input area 202 (refer to FIG. 5) simultaneously on the display device 34 for an operator which is a display device. The balance information is information regarding the balance in the automatic change dispenser 100 calculated by the balance calculating portion 123 of the automatic change dispenser 100. The input area 202 receives the input of change reserves information regarding change reserves, which should be prepared in the automatic change dispenser 100, through the touch panel 43. Specifically, the first display control portion 81 generates image data of a change management screen 200 (refer to FIG. 5) and displays the change management screen 200 on the display device 34 for an operator using the image data. In addition, the first display control portion 81 may display the change reserves information set in advance in the input area 202 on the display device 34 for an operator so as to be rewritable. The change reserves information set in advance may be set for every day of the week, for example. The change reserves information set in advance is stored in the HDD 55 as a storage unit, for example. The first display control portion 81 reads the change reserves information set in advance from the HDD 55 and displays it on the display device 34 for an operator.

Figure 5:
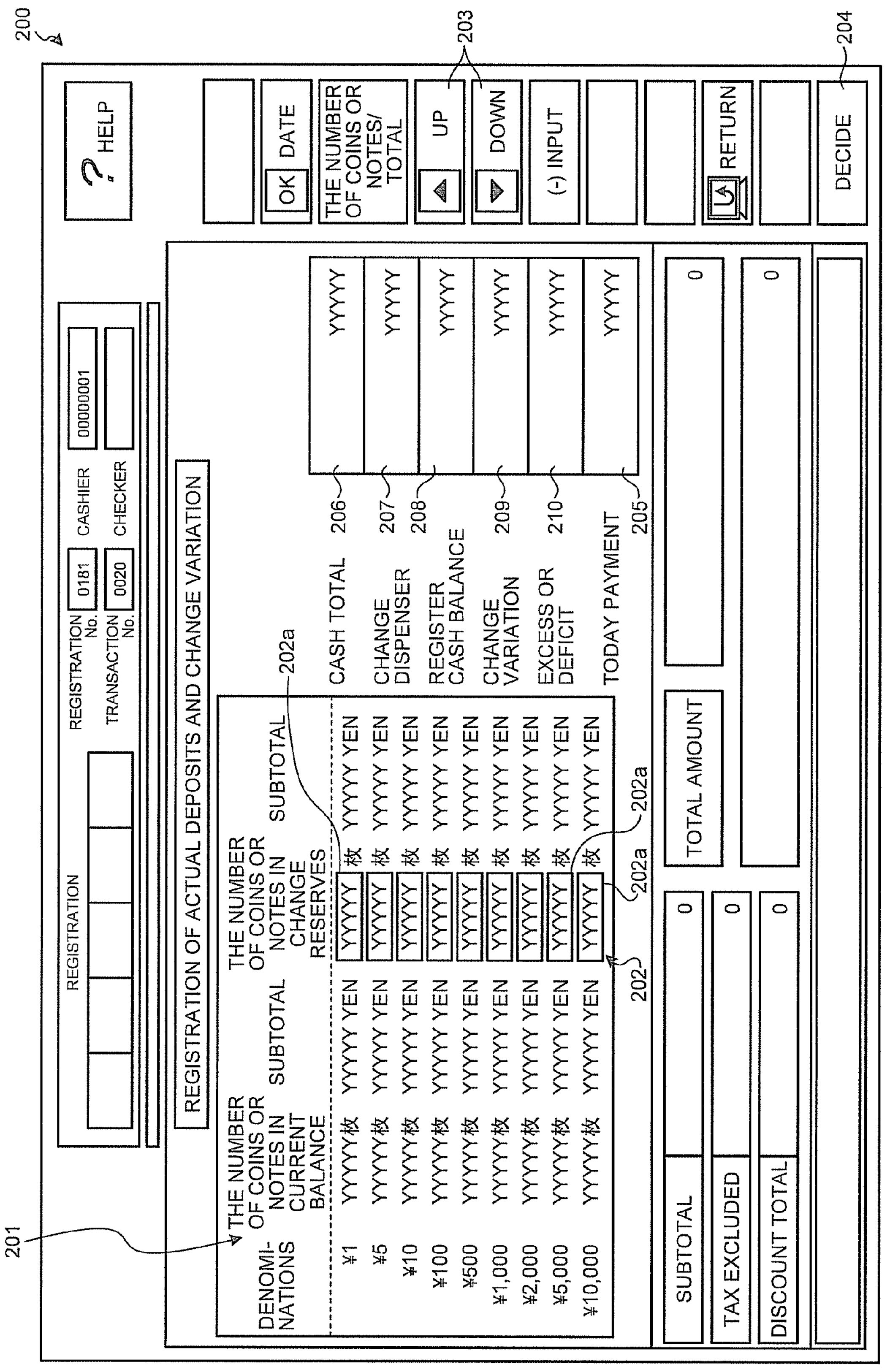
FIG. 5 is a view showing a change management screen of the POS terminal according to the first embodiment.

FIG. 5 is a view showing the change management screen 200 of the POS terminal 10. The change management screen 200 displays the balance information 201 regarding the balance in the automatic change dispenser 100 and the input area 202. The input area 202 has an individual area 202*a*, which is an input area of each denomination, for every denomination. As the change reserves information, the input area 202 (individual area 202*a*) receives the input of the number of coins or notes as change reserves for every denomination. In addition, the change management screen 200 displays a go button 203, a decision button 204, a today payment area 205, and the like. The go button 203 moves a cursor on the screen. The decision button 204 decides figures input in the input area 202. On the change management screen 200, a figure can be input to the individual area 202*a* selected by the cursor using the numeric keys of the keyboard 32. Accordingly, when inputting the change reserves information, the operator first moves a cursor to the desired individual area 202*a* by operating the go button 203. Then, the operator inputs a figure to the individual area 202*a*, to which the cursor was moved, using the numeric keys of the keyboard 32. Through the above operation, the change reserves information is input. In addition, Y in FIG. 5 indicates an arbitrary figure.

In addition, the change management screen 200 includes a cash total display area 206, a change dispenser display area 207, a register cash balance display area 208, a change variation display area 209, and an excess and deficit display area 210. The cash total display area 206 displays the current balance in the automatic change dispenser 100 (hereinafter, also referred to as an actual balance). The change dispenser display area 207 displays the amount of money, which remains without being dispensed from the automatic change dispenser 100, on the basis of the information input to the input area 202. The register cash balance display area 208 displays the theoretical balance of the automatic change dispenser 100 that the POS terminal 10 calculated on the basis of sales registration processing (hereinafter, also referred to as a theoretical balance). The change variation display area 209 displays the amount of money, which is supplemented as change, on the basis of the information input to the input area 202. The excess and deficit display area 210 displays the excess or the deficit of the actual balance with respect to the theoretical balance. The today payment area 205 displays the amount of money obtained by subtracting the amount of money of the change dispenser display area 207 and the amount of money of the change variation display area 209 from the amount of money of the cash total display area 206.

The calculation portion 82 calculates a difference between the change reserves and the amount of money in the automatic change dispenser 100 on the basis of the balance information and the change reserves information input to the input area 202. This difference is the amount of money taken out from the automatic change dispenser.

The second display control portion 83 functions as a second display control unit. The second display control portion 83 displays the balance calculated by the calculation portion 82 in the today payment area 205 on the change management screen 200.

The payment registration portion 84 stores the difference calculated by the calculation portion 82 in a sales file as the amount of payment.

The payment information generating portion 85 functions as a payment information generating unit. The payment information generating portion 85 generates the payment information on the basis of the balance information and the change reserves information input to the input area 202. The payment information indicates the payment of the automatic change dispenser 100. The payment information includes the number of coins or notes of each denomination, for example.

The payment information transmitting portion 86 transmits to the automatic change dispenser 100 the payment information generated by the payment information generating portion 85. The payment information transmitting portion 86 transmits the payment information to the automatic change dispenser 100 by controlling the communication interface 74.

Figure 6:
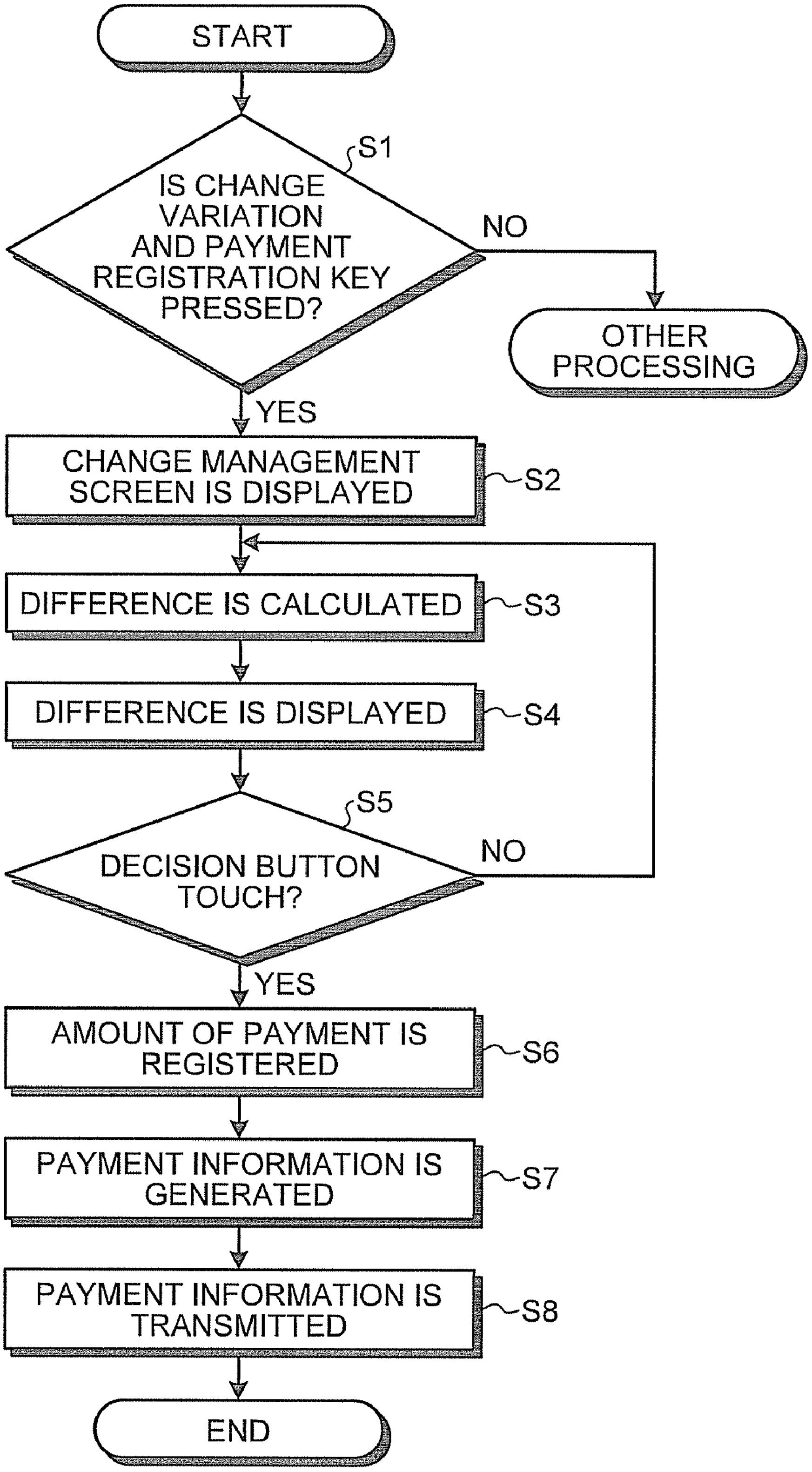
FIG. 6 is a flow chart showing the change management processing of the POS terminal according to the first embodiment.

Referring to the flow chart in FIG. 6, the change management processing will be described. When the CPU 38 of the POS terminal 10 determines that the change variation and payment registration key 32*a* was pressed (Yes in Act 1), the CPU 38 displays the change management screen 200 on the display device 34 for an operator (Act 2). In this case, the CPU 38 transmits a balance request command to the automatic change dispenser 100 through the communication interface 116 and receives the balance information from the balance calculating portion 123 as the response. When the CPU 38 determines that other keys were pressed instead of the change variation and payment registration key 32*a* (No in Act 1), the first display control portion 81 executes other processing corresponding to other buttons.

Then, the CPU 38 calculates a difference between the change reserves and the amount of money in the automatic change dispenser 100 on the basis of the balance information 201 and the change reserves information input to the input area 202 (Act 3). The CPU 38 displays the calculated difference on the change management screen 200 of the display device 34 for an operator (Act 4). Then, while the decision button 204 is not touched (No in Act 5), the CPU 38 repeats the processing in Acts 3 and 4 whenever the change reserves information is input to the input area 202.

When it is determined that the decision button 204 was touched (Yes in Act 5), the CPU 38 stores the difference calculated in Act 3 in a sales file as the amount of payment (Act 6). The CPU 38 generates the payment information (Act 7) and transmits the generated payment information to the automatic change dispenser 100 (Act 8).

On the other hand, the automatic change dispenser 100 which received the payment information from the POS terminal 10 dispenses money of each denomination on the basis of the received payment information.

As described above, in the present embodiment, the first display control portion 81 of the POS terminal 10 displays the balance information 201 regarding the balance of each denomination in the automatic change dispenser 100, which was calculated by the balance calculating portion 123, and the input area 202, which receives through the touch panel 43 the input of the change reserves information regarding the change reserves to be stored in the automatic change dispenser 100, simultaneously on the display device 34 for an operator. Accordingly, the clerk can perform an input operation in the input area 202 while checking the balance information regarding the balance in the automatic change dispenser 100. Thus, according to the present embodiment, it becomes easy to prepare change reserves in the automatic change dispenser 100.

Moreover, in the POS terminal 10 of the present embodiment, the calculation portion 82 calculates the difference between the change reserves and the amount of money in the automatic change dispenser 100 on the basis of the balance information and the change reserves information input to the input area 202. In addition, the second display control portion 83 displays the calculated difference on the display device 34 for an operator. Accordingly, the clerk can easily check the amount of payment.

Moreover, in the POS terminal 10 of the present embodiment, the payment information generating portion 85 generates the payment information on the basis of the balance information 201 and the change reserves information input to the input area 202. Then, the payment information transmitting portion 86 transmits the payment information to the automatic change dispenser 100. Accordingly, the automatic change dispenser 100 can dispense the difference.

Moreover, in the present embodiment, the change reserves information is the number of coins or notes of each denomination as the change reserves or the increased or decreased number of coins or notes of each denomination with respect to the balance. Accordingly, it is possible to easily input the change reserves information.

In addition, the merchandise sales data processing apparatus may also be applied to an ECR (Electric Cash Register). Moreover, the balance management system may also be applied to a self-checkout system including a POS terminal and an automatic change dispenser.

Moreover, a balance calculating portion may be provided in the POS terminal 10. In this case, the initial value of the balance in the automatic change dispenser 100 is stored in the POS terminal 10. Accordingly, the balance calculating portion can calculate the balance in the automatic change dispenser 100 on the basis of the initial value of the balance and the change data of each transaction.

In addition, a program executed by the POS terminal 10 or the automatic change dispenser 100 of the present embodiment may be supplied in a state where it is recorded as an installable or executable file in computer-readable recording media, such as a CD-ROM, a flexible disk (FD), a CD-R, and a DVD.

Moreover, the program executed by the POS terminal 10 or the automatic change dispenser 100 of the present embodiment may be supplied by storing it in a computer connected to a network, such as the Internet, and downloading it through the network. In addition, the program executed by the POS terminal 10 or the automatic change dispenser 100 of the present embodiment may be supplied or distributed through the network, such as the Internet.

[Second Embodiment]

Figure 7:
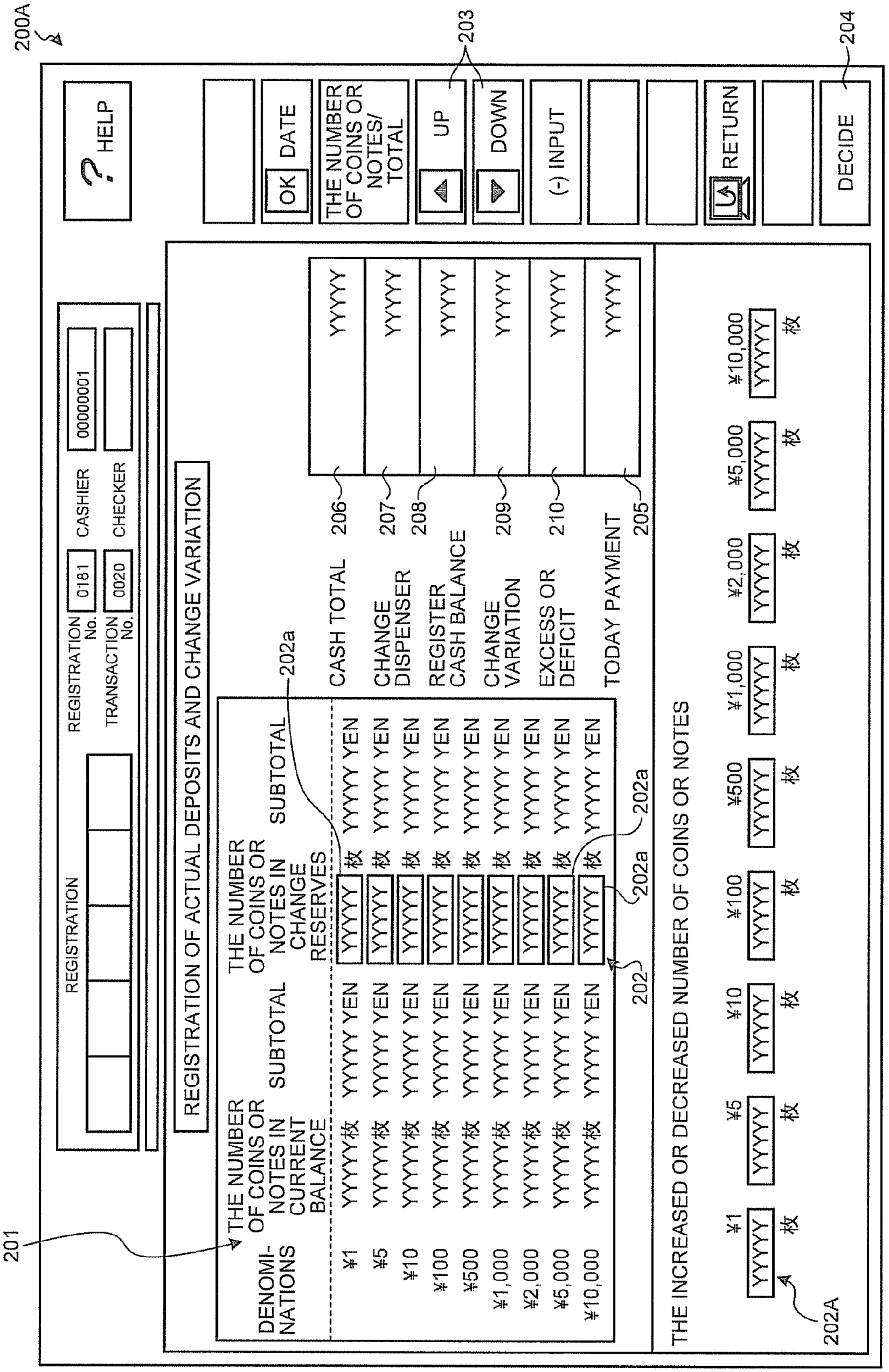
FIG. 7 is a view showing a change management screen of a POS terminal according to a second embodiment.

FIG. 7 is a view showing a change management screen of a POS terminal according to a second embodiment. In the present embodiment, the change management screen 200 displayed on the display device 34 for an operator by the first display control portion 81 is different from that in the first embodiment.

In the present embodiment, the first display control portion 81 (refer to FIG. 4) generates image data of a change management screen 200A and displays the change management screen 200A on the display device 34 for an operator using the image data. The change management screen 200A has a second input area 202A. Similar to the change management screen 200 of the first embodiment, the change management screen 200A includes the balance information 201, the input area 202, the go button 203, the decision button 204, the today payment area 205, the cash total display area 206, the change dispenser display area 207, the register cash balance display area 208, the change variation display area 209, the excess and deficit display area 210, and the like.

The second input area 202A receives the input of the change reserves information regarding change reserves, which should be prepared in the automatic change dispenser 100, through the touch panel 43. Specifically, the input area 202A has an individual area 202*a*A, which is an input area of each denomination. The input area 202A (individual area 202*a*A) receives, as the change reserves information, the input of the increased or decreased number of coins or notes with respect to the balance (specifically, the number of coins or notes) in the automatic change dispenser 100 for every denomination. In order to decrease the number of coins or notes, the operator inputs "–" to the individual area 202*a*A selected by the cursor using the minus key of the keyboard 32.

In the present embodiment, the CPU 38 interlocks the display of the input area 202 with the display of the second input area 202A. When the number of coins or notes is input to the second input area 202A, the CPU 38 (calculation portion 82) adds the input number of coins or notes and the number of coins or notes in the automatic change dispenser 100 (number of coins or notes displayed on the balance information 201) for every denomination. Then, the CPU 38 (second display control portion 83) displays the value obtained by the addition in the input area 202. On the other hand, when the number of coins or notes is input to the input area 202, the CPU 38 (calculation portion 82) calculates the increased or decreased number of coins or notes (the increased or decreased number of coins or notes expected) in the automatic change dispenser 100 by subtracting the number of coins or notes in the automatic change dispenser 100 from the number of coins or notes input to the input area 202 for every denomination. Then, the CPU 38 (second display control portion 83) displays in the second input area 202A the increased or decreased number of coins or notes calculated.

[Third Embodiment]

Figure 8:
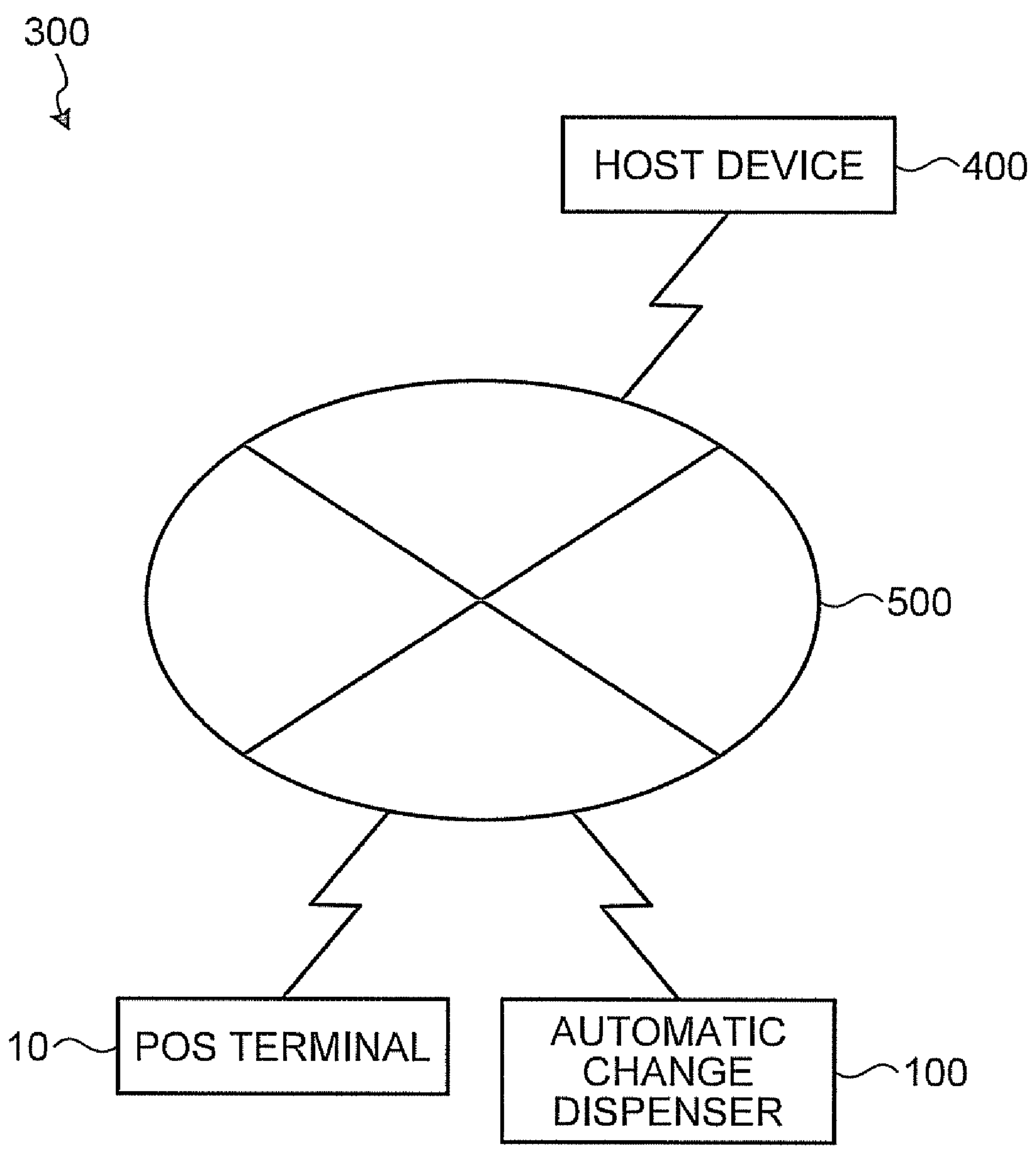
FIG. 8 is a view showing a balance management system according to a third embodiment.

FIG. 8 is a view showing a balance management system 300 according to a third embodiment. The balance management system 300 includes the POS terminal 10, the automatic change dispenser 100, and a host device 400. The POS terminal 10, the automatic change dispenser 100, and the host device 400 are communicably connected to each other through a communication network 500.

The POS terminal 10 is the same as that described in the first or second embodiment. Hereinafter, an example of the POS terminal 10 in the first embodiment will be described. Basically, the automatic change dispenser 100 is the same as that described in the first embodiment. However, the automatic change dispenser 100 is different from that described in the first embodiment in that the balance information generating portion 124 is not provided.

Figure 9:
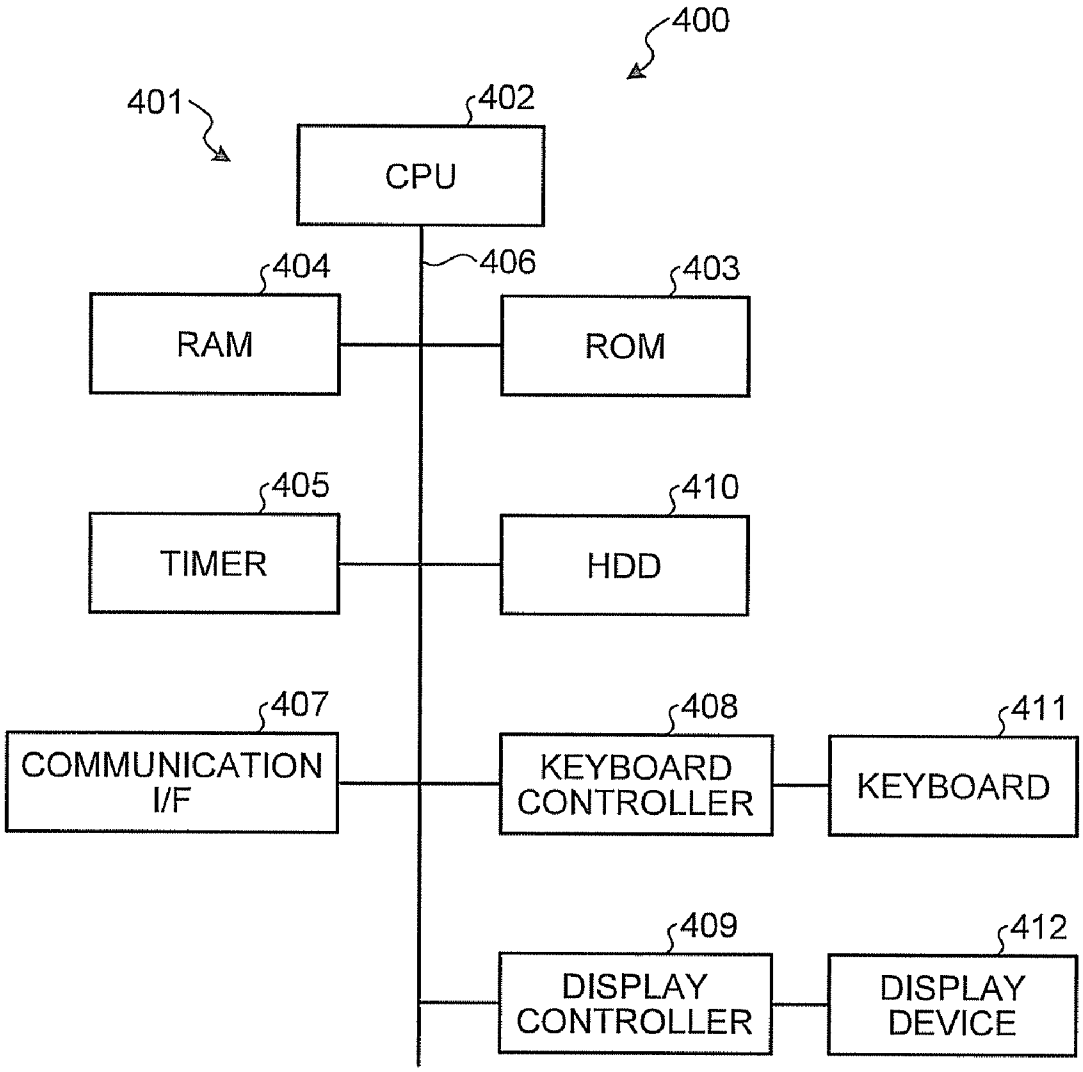
FIG. 9 is a block diagram showing a host device in the third embodiment.

FIG. 9 is a block diagram showing the host device 400 in the third embodiment. The host device 400 is an information processing apparatus, for example, a personal computer. The host device 400 includes a control unit 401. The control unit 401 includes a CPU 402, a ROM 403, a RAM 404, and a timer 405. The ROM 403, the RAM 404, and the timer 405 are connected to the CPU 402 through a bus line 406, such as an address bus or a data bus. The RAM 403 has a memory area regarding the number of held coins or notes where the number of coins or notes of each denomination held in the money holding portion 111 of the automatic change dispenser 100 is stored. In the present embodiment, when depositing or dispensing was performed in the automatic change dispenser 100, the host device 400 receives from the automatic change dispenser 100 the number of deposited or dispensed coins or notes of each denomination counted by the portion configured to count the number of deposited coins or notes 115 or the portion configured to count the number of dispensed coins or notes.

A communication I/F 407, a keyboard controller 408, a display controller 409, and an HDD 410 are connected to the bus line 406 connected to the CPU 402.

The communication I/F 407 executes data communication with the POS terminal 10 and the automatic change dispenser 100. A keyboard 411 is connected to the keyboard controller 408. A display device 412 is connected to the display controller 409.

The HDD 410 stores a computer program for operating the control unit 401 (CPU 402), a product master file, and a sales file in which sales data and the like are stored. The computer program stored in the HDD 410 is written into the RAM 404 together with various files, such as a product master file, at the start of the host device 400. As a result, driving control of each portion of the control unit 401 becomes possible.

Figure 10:
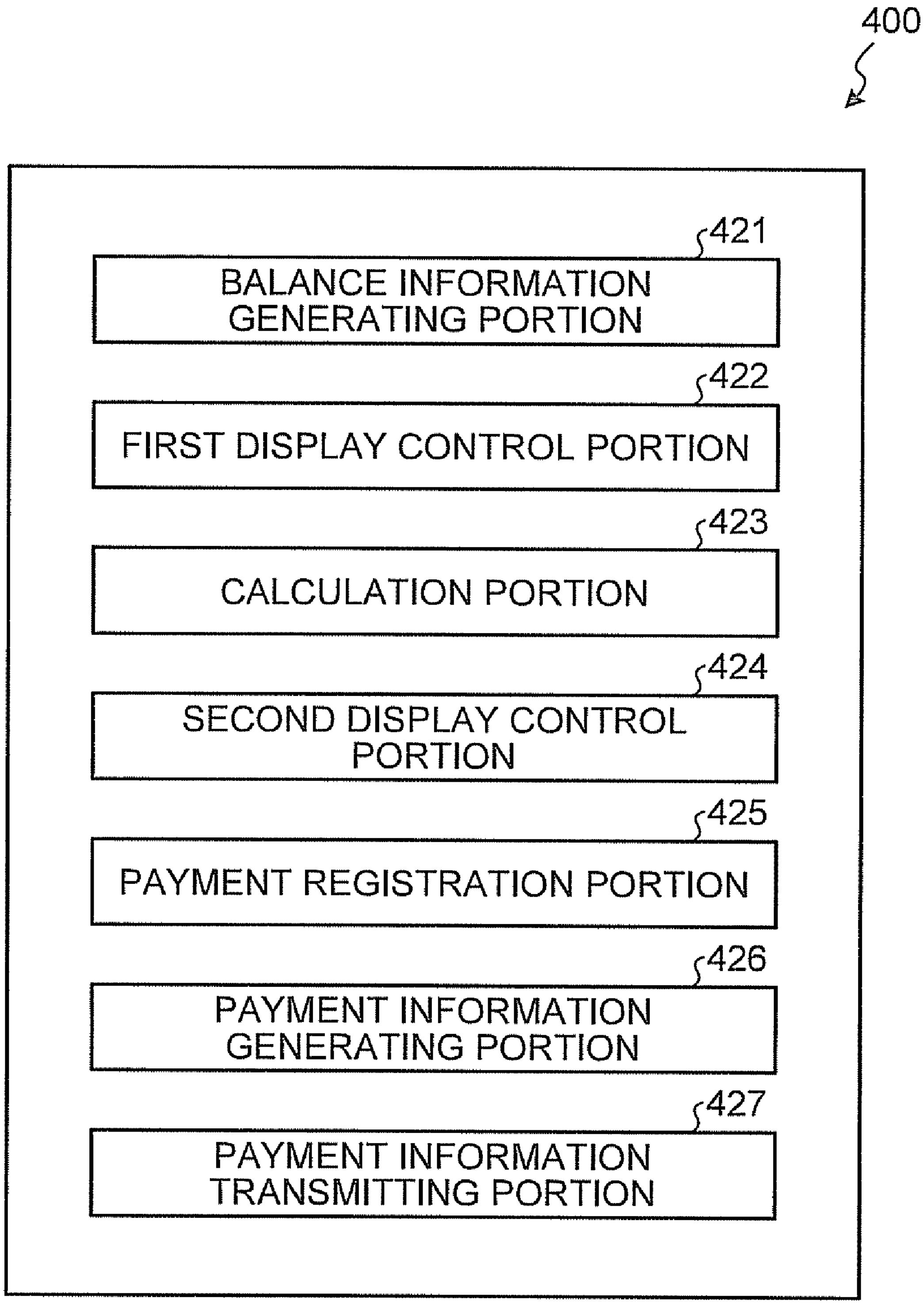
FIG. 10 is a block diagram showing the functional configuration of the host device in change management processing in the third embodiment.

As shown in FIG. 10, the CPU 402 of the host device 400 realizes a balance information generating portion 421 as a balance information generating unit, a first display control portion 422 as a first display control unit, a calculation portion 423 as a calculation unit, a second display control portion 424 as a second display control unit, a payment registration portion 425 as a payment register, a payment information generating portion 426 as a payment information generating unit, and a payment information transmitting portion 427 as a payment information transmitting unit, as functional portions, according to the program. Each of the portions performs the same operation as that described in the first embodiment.

Similar to the first embodiment, the balance information generating portion 421 includes a portion configured to update the number of held coins or notes and a balance calculating portion, and generates the balance information indicating the balance of each denomination in the automatic change dispenser 100. Here, the portion configured to update the number of held coins or notes updates the value of the memory area regarding the number of held coins or notes of the RAM 404 on the basis of the number of deposited or dispensed coins or notes of each denomination received from the automatic change dispenser 100.

Figure 11:
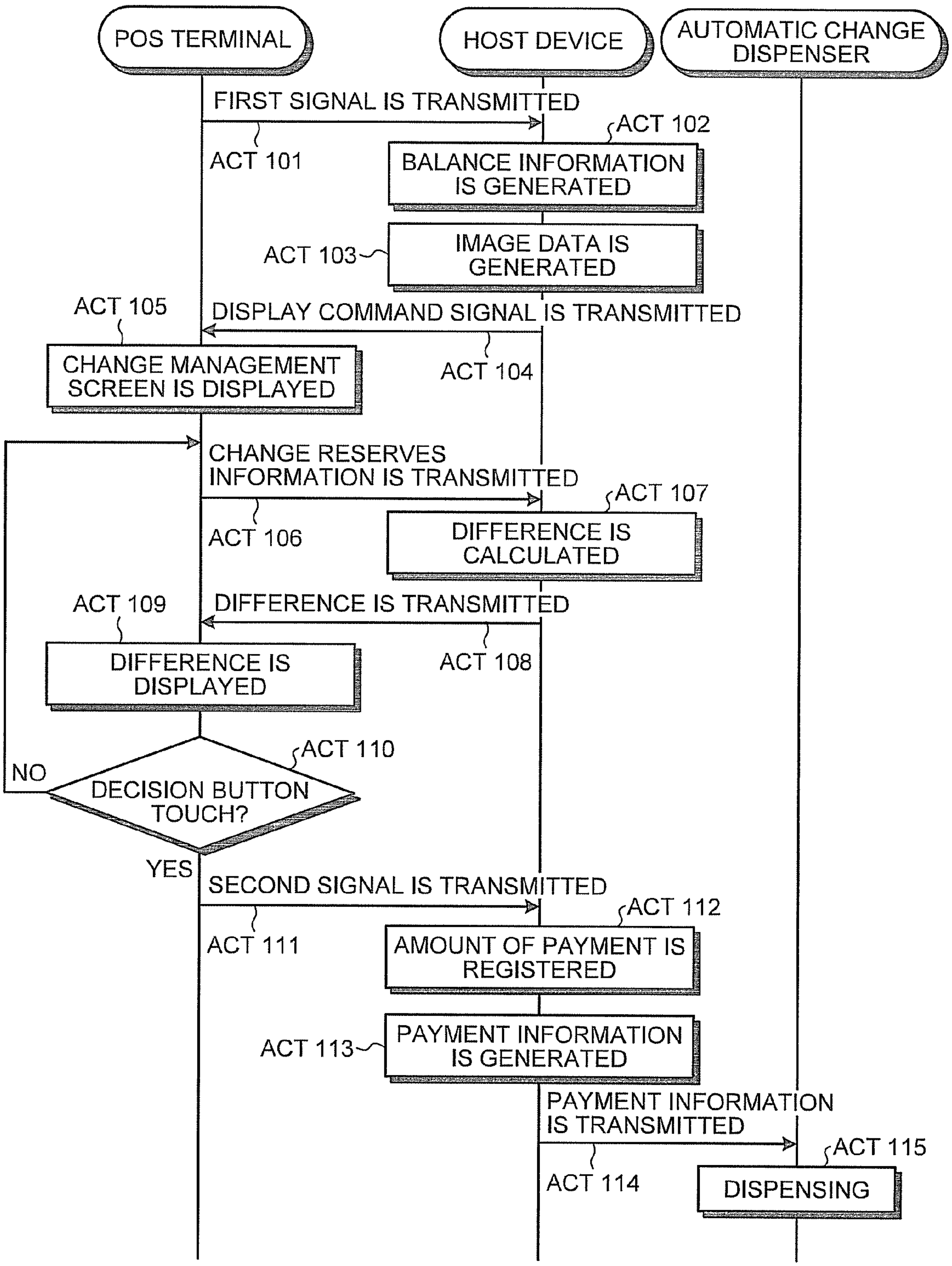
FIG. 11 is a flow chart showing the change management processing in the third embodiment.

Next, change management processing among various kinds of management executed by the balance management system 300 will be described with reference to FIG. 11. FIG. 11 is a flow chart showing the change management processing in the third embodiment. Although the change management processing of the present embodiment is basically the same as that described in the first embodiment, it is different from the change management processing in the first embodiment in that the host device 400 is added in the processing.

When the change variation and payment registration key 32*a* is pressed, the CPU 38 of the POS terminal 10 transmits a first signal, which indicates that the change variation and payment registration key 32*a* was pressed, to the host device 400 through a communication network 500 (Act 101).

The CPU 402 of the host device 400 generates the balance information after receiving the first signal (Act 102). Specifically, the CPU 402 calculates the balance, which is the total amount of cash in the automatic change dispenser 100 at present, using the data regarding the number of held coins or notes of each denomination stored in the memory area regarding the number of held coins or notes of the RAM 404. Moreover, the CPU 402 calculates the total amount of money (balance) for every denomination in the automatic change dispenser 100. The CPU 402 stores the number of coins or notes of each denomination, the calculated balance, and the total amount (balance) for every denomination in the RAM 404 as the balance information. Then, the CPU 402 generates the image data of the change management screen 200 using the balance information (Act 103). The CPU 402 transmits a display command signal including the generated image data to the POS terminal 10 (Act 104), and displays the change management screen 200 on the display device 34 for an operator of the POS terminal 10. Here, the function of the first display control portion 422 is executed. Specifically, in this case, the CPU 38 of the POS terminal 10 receives a display command signal and displays the change management screen 200 on the display device 34 for an operator according to the display command signal (Act 105).

Then, when the change reserves information is input to the input area 202, the CPU 38 of the POS terminal 10 transmits the input change reserves information to the host device 400 through the communication network 500 (Act 106).

After receiving the change reserves information, the CPU 402 of the host device 400 calculate a difference between the change reserves and the amount of money in the automatic change dispenser 100 on the basis of the received change reserves information and the balance information generated in Act 102 (Act 107). The CPU 402 transmits the calculated difference to the POS terminal 10 through the communication network 500 (Act 108), and displays the difference on the change management screen 200 of the display device 34 for an operator of the POS terminal 10. In this case, the CPU 38 of the POS terminal 10 receives the difference and displays it on the change management screen 200 of the display device 34 for an operator (Act 109).

While the decision button 204 is not touched (No in Act 110), the balance management system 300 repeats the processing in Acts 106 to 109 whenever the change reserves information is input to the input area 202.

When the decision button 204 is touched (Yes in Act 110), the CPU 38 of the POS terminal 10 transmits a second signal, which indicates that the decision button 204 was touched, to the host device 400 through the communication network 500 (Act 111).

The CPU 402 of the host device 400 registers the difference calculated in Act 108 as the amount of payment when the second signal is received (Act 112). Specifically, the CPU 402 stores the difference in a sales file as the amount of payment. Then, the CPU 402 generates the payment information (Act 113) and transmits the generated payment information to the automatic change dispenser (Act 114).

After receiving the payment information from the host device 400, the automatic change dispenser 100 dispenses money of each denomination on the basis of the received payment information (Act 115).

According to each of the embodiments described above, the preparatory work of change reserves in the automatic change dispenser can be easily performed.

While certain embodiments have been described, these embodiments have been presented by way of example only, and are not intended to limit the scope of the inventions. Indeed, the apparatus, systems and method described herein may be embodied in a variety of other forms; furthermore, various omissions, substitutions and changes in the form of the apparatus, systems and method described herein may be made without departing from the spirit of the inventions. The accompanying claims and their equivalents are intended to cover such forms or modifications as would fall within the scope and spirit of the inventions.

What is claimed is:

1. A merchandise sales data processing apparatus comprising:

a display device; and a first display control unit that displays balance information, wherein the balance information is generated by a balance information generating unit that generates the balance information including a number of coins or notes and a total amount of each denomination in an automatic change dispenser which deposits or dispenses money, and an input area that receives through an input device input of change reserves information regarding change reserves to be prepared in the automatic change dispenser, a first display area that displays a current balance in the automatic change dispenser, a second display area that displays a theoretical balance of the automatic change dispenser, and a third display area that displays a difference between a balance in the balance information generated by the balance information generating unit and the theoretical balance, simultaneously on the display device.

2. The apparatus according to claim 1, further comprising:

a calculation unit that calculates a difference between the change reserves and an amount of money in the automatic change dispenser based on the balance information and the change reserves information input to the input area to yield a calculated difference; and a second display control unit that displays the calculated difference on the display device.

3. The apparatus according to claim 1, further comprising:

a payment information generating unit that generates payment information based on the balance information and the change reserves information input to the input area, wherein the payment information instructs payment to the automatic change dispenser; and a payment information transmitting unit that transmits the payment information to the automatic change dispenser.

4. The apparatus according to claim 1, wherein the change reserves information is the number of coins or notes as the change reserves for respective denominations.

5. The apparatus according to claim 4, further comprising:

a calculation unit; and a second display unit, wherein the balance information includes the number of coins or notes of each denomination in the automatic change dispenser, the calculation unit calculates an increased or decreased number of coins or notes in the automatic change dispenser by subtracting the number of coins or notes in the automatic change dispenser from a number of coins or notes input to the input area for the respective denominations, and the second display unit displays the increased or decreased number of coins or notes on the display device.

6. The apparatus according to claim 1, wherein the change reserves information is an increased or decreased number of coins or notes with respect to a balance of each denomination.

7. The apparatus according to claim 1, wherein the first display control unit displays the change reserves information set in advance in the input area on the display device so as to be rewritable.

8. The apparatus according to claim 1, wherein the theoretical balance is calculated by the merchandise sales data processing apparatus based on sales registration processing.

9. A balance management system comprising:

a display device;

an automatic change dispenser that deposits or dispenses money;

a balance information generating unit that generates balance information including a number of coins or notes and a total amount of each denomination in the automatic change dispenser; and a first display control unit that displays the balance information and an input area, that receives, through an input device, input of change reserves information regarding change reserves to be prepared in the automatic change dispenser, a first display area that displays a current balance in the automatic change dispenser, a second display area that displays a theoretical balance of the automatic change dispenser, and a third display area that displays a difference between a balance in the balance information generated by the balance information generating unit and the theoretical balance, simultaneously on the display device.

10. The system according to claim 9, further comprising:

a calculation unit that calculates a difference between the change reserves and an amount of money in the automatic change dispenser based on the balance information and the change reserves information input to the input area to yield a calculated difference; and a second display control unit that displays the calculated difference on the display device.

11. The system according to claim 9, further comprising:

a payment information generating unit that generates payment information based on the balance information and the change reserves information input to the input area, wherein the payment information instructs payment to the automatic change dispenser; and a payment information transmitting unit that transmits the payment information to the automatic change dispenser.

12. The system according to claim 9, wherein the change reserves information is the number of coins or notes as the change reserves for respective denominations.

13. The system according to claim 12, further comprising:

a calculation unit; and a second display unit, wherein the balance information includes the number of coins or notes of each denomination in the automatic change dispenser, the calculation unit calculates an increased or decreased number of coins or notes in the automatic change dispenser by subtracting the number of coins or notes in the automatic change dispenser from a number of coins or notes input to the input area for every denomination and the second display unit displays the increased or decreased number of coins or notes on the display device.

14. The system according to claim 9, wherein the change reserves information is an increased or decreased number of coins or notes with respect to a balance of each denomination.

15. The system according to claim 9, wherein the first display control unit displays the change reserves information set in advance in the input area.

16. The system according to claim 9, wherein the theoretical balance is calculated by the merchandise sales data processing apparatus based on sales registration processing.

17. A display method executed by a merchandise sales data processing apparatus including a display device, comprising:

generating, by a balance information generating unit, balance information including a number of coins or notes and a total amount of each denomination in an automatic change dispenser which deposits or dispenses money;

receiving, through an input device, an input of change reserves information regarding change reserves to be prepared in the automatic change dispenser; and simultaneously displaying on the display device by means of a first display control unit:

a current balance in the automatic change dispenser, a theoretical balance of the automatic change dispenser, and a difference between a balance in the balance information generated by the balance information generating unit and the theoretical balance.

18. The method according to claim 17, wherein the theoretical balance is calculated by the merchandise sales data processing apparatus based on sales registration processing.

* * * * *